May 19, 1970    MOTOKUNI KAGE    3,512,832
HEAD-REST FOR THE SEAT OF VEHICLES
Filed July 25, 1968

INVENTOR.
MOTOKUNI KAGE
BY
*Harry G. Shapiro*
ATTORNEY

United States Patent Office 3,512,832
Patented May 19, 1970

3,512,832
HEAD-REST FOR THE SEAT OF VEHICLES
Motokuni Kage, Toyota-shi, Japan, assignor to Toyota Jidosha Kogyo Kabushiki Kaisha, Toyota-shi, Japan, a corporation of Japan
Filed July 25, 1968, Ser. No. 747,656
Claims priority, application Japan, Aug. 23, 1967, 42/72,586
Int. Cl. 47c 7/36
U.S. Cl. 297—410     1 Claim

ABSTRACT OF THE DISCLOSURE

This invention relates to a head-rest for car-seat wherein the stays of the head-rest are fitted adjustably on the frame of the back of the seat, which is characterized in that a plurality of concaved portions for adjustment rectangularly against the axial direction thereof are provided at the portion of the stays in the up-and-down direction, which are inserted inside the back of the seat through the surface leather holes, and a fitting tool to be fitted to one of the concaved portions for adjustment, is provided on the frame of the back of the seat, and the stay-guides for fitting the stays movably is provided on the frame of the back of the seat, and the stay-guide accessories, one end of which is inserted into a part of said stay guides, and the other end of which is fixed to the holes of the surface leather of the back through which the stays are passed through, are provided to smoothly adjust the head rest in the up-and-down direction against the back of the seat by moving inside the stay guides and the stay guides accessories.

---

This invention relates to the height adjustable head-rest provided on the back of the seat of vehicles.

The object of this invention is to make the height thereof adjustable, to have the same perform the role of hole-cover of the holes of the surface leather, to make the up-and-down movement of the stay carried out smoothly, and to prevent the dangers caused in front from the passengers on the rear seat, by the plastic deformation of the members when vehicles are crushed, by providing the head-rest on the back of the seat.

In accordance with the invention, a head-rest for car-seat wherein the stays of the head-rest are fitted adjustably on the frame of the back of the seat, is characterized in that a plurality of concaved portions for adjustment rectangularly against the axial direction thereof are provided at the portion of the stays in the up-and-down direction, which are inserted inside the back of the seat through the surface leather holes, and a fitting tool to be fitted to one of the concaved portions for adjustment, is provided on the frame of the back of the seat, and the stay guides for fixing the stays movably is provided on the frame of the back of the seat, and the stay-guide accessories, one end of which is inserted into a part of said stay guides, and the other end of which is fitted to the holes of the surface leather of the back through which the stays are passed through are provided to smoothly adjust the head rest in the up-and-down direction against the back of the seat by moving inside the stay guides and the stay guides accessories.

This invention will be described more clearly referring to the illustrative embodiments shown in the attached drawing, in which:

FIG. 1 is a perspective view of an embodiment of this invention, while

Figure 1:
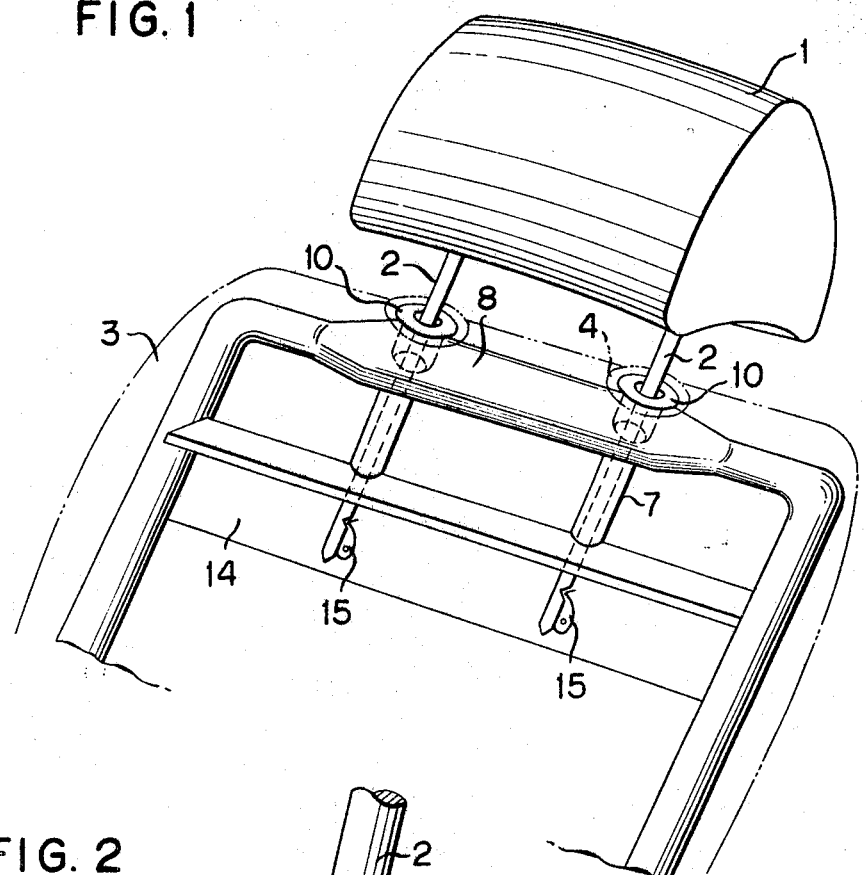
Figure 2:
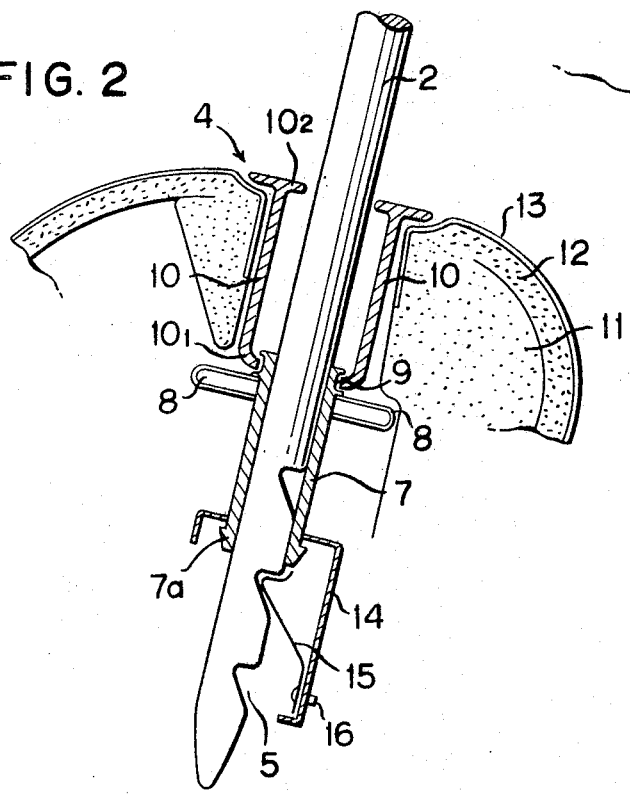
FIG. 2 is a vertical cross sectional view of the main portion thereof.

Referring first to FIG. 1, one or more than one of the stays 2 are provided on the lower surface of the head-rest 1, and the stays 2 are inserted into the holes 4 of the surface leather of the back 3 of the seat.

The frame of the back 3 is composed of a pipe shaped main frame member 8, cross section of horizontal portion of which is shaped elliptical form, and a horizontal stay 14, both ends of which are fixed onto the main frame member 8 at the intermediate portion of the vertical portion, by means such as welding; 15 is a spring, one end of which is formed convexed projection and the other end is fixed onto the horizontal stay 14 by means such as riveting 16. The projection of the spring 15 is fitted to one of the notches 5 of the stays 2 to fix the stays in the desired adjusted position. The stay guides 7 for movably inserting the stays 2 into the lower-inside of the back of the seat, is fixed onto the frames 8 and horizontal stay 14 by an upper flange of the stay guides 7 and nuts 7a fitted to the lower portion thereof, and an insertion portion such as ring form groove 9, is provided on the upper portion of the stay guide 7, and the convexed projection $10_1$ of the cylindrical form stay guide accessory 10 made of flexible material such as soft synthetic resin or rubber form material, having the convexed projection $10_1$ on the lower portion thereof for inserting the lower ends of the guide accessory 10 into the insertion portion 9, and a flange portion $10_2$ on the upper portion thereof, provided on the upper portion of the stay guide, is inserted into the insertion portion 9; 11 is the safety and pad of the back 3 of the seat; 12 is a seat cover made of urethane foam rubber, etc.; 13 is a surface leather.

The structure of this invention is as given above, and therefore a passenger can move the stays 2 within the stay guides 7 and the stay guide accessories 10 by adjusting the height of the head-rest in accordance with the height of the passenger to the effect that these can perform the guides of the stays, and the lower portions of the stays are tightly retained on the sliding surface of the stay guide 7, and in the upper portions of the stays there are plays between the internal diameter side of the stay guide accessories 10 and the external diameter side of the stays, but when a back-going force should be given temporarily to the head-rest 1, the stays 2 can be retained by the stay guide accessories 10 flexibly, and the head-rest 1 is smoothly adjusted in the up-and-down direction against the back 3, and at the same time, the head of the passenger can be pleasantly placed on the head-rest.

The stay guide accessories 10 cover the holes of the surface leather 13 to give excellent look from the standpoint of design, and the safety pads do not touch the stays, and the pads are not wound up on the stays or wound in by the stay guides, and in addition, when the head-rest is adjusted upwards, or it is removed, even if the head of a passenger on the rear seat hits the back of the front in a car-crush, the flexible stay guide accessories are plastically deformed to save the passenger on the rear seat from injuries.

What is claimed is:

1. Head-rest for car-seat wherein the stays of the head-rest are fitted adjustably on the frame of the back of the seat, which is characterized in that a plurality of concaved portions for adjustment rectangularly against the axial direction thereof are provided at the portion of the stays in the up-and-down direction, which are inserted inside the back of the seat through the surface leather holes, and a fitting tool to be fitted to one of the concaved portions for adjustment, is provided on the frame of the back of the seat, and the stay guides for fitting the stays movably is provided on the frame of the back of the seat, and the stay-guide accessories, one end of which is inserted into a part of said stay guides, and the other end of which is fitted to the holes of the surface leather of the back through which the stays are passed through, are provided to smoothly adjust the head rest in the up-and-down direction against the back of the seat by moving inside the stay guides and the stay guides accessories.

References Cited

UNITED STATES PATENTS

| | | | |
|---|---|---|---|
| 377,147 | 1/1888 | Delaney | 297—410 X |
| 1,196,413 | 8/1916 | Yohe | 297—410 |
| 1,714,696 | 5/1929 | Samuelian | 297—410 X |
| 2,613,731 | 10/1952 | Roginski | 297—410 X |
| 3,145,965 | 8/1964 | Stein | 248—408 |

NILE C. BYERS, JR., Primary Examiner

U.S. Cl. X.R.

248—408